Figure 1:
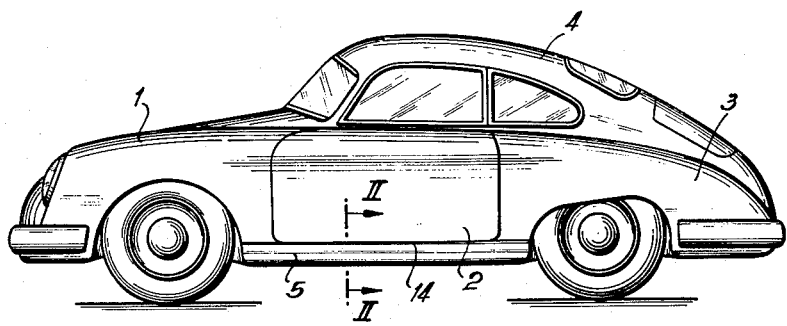

April 24, 1962  E. KOMENDA ET AL  3,031,224
VEHICLE BODY CONSTRUCTION
Filed Feb. 12, 1959

INVENTORS
ERWIN KOMENDA
FRIEDRICH BLASCHKA

ATTORNEYS

United States Patent Office 3,031,224
Patented Apr. 24, 1962

3,031,224
VEHICLE BODY CONSTRUCTION
Erwin Komenda and Friedrich Blaschka, Stuttgart, Germany, assignors to Dr.-Ing. h.c. F. Porsche K.G., Stuttgart-Zuffenhausen, Germany
Filed Feb. 12, 1959, Ser. No. 792,764
Claims priority, application Germany Feb. 20, 1958
5 Claims. (Cl. 296—28)

The present invention relates to the construction of a vehicle body for motor vehicles, especially passenger motor vehicles provided with a longitudinal bearer member extending between the front and rear wheels of the vehicle and conforming to the contours of the adjacent wall parts of the vehicle body which longitudinal bearer member preferably also forms the sill or threshold of the vehicle.

The known vehicle constructions of the prior art are provided with essentially smooth or plain surfaces by reason of the requirements of streamlining thereof. The largest width of the vehicle is thereby disposed predominantly at the height of the elbow of the passenger in order to obtain the best possible utilization of the vehicle interior space. With a decreasing overall height of the vehicle, as is the present trend in vehicle design, the width of the vehicle body also becomes smaller so that the door gap, within the region between the front and rear wheels, which is unprotected, is exposed to soiling by the road particles thrown up by the vehicle wheels and especially to water which may be splashed against the vehicle body by the wheels while passing through it.

This disadvantage is obviated in accordance with the present invention by providing a sill or threshold or a pressed or stamped part connected therewith at the side thereof facing the road surface which extends outwardly beyond the contours of the other side wall body parts for purposes of constituting a splash guard or stone deflector.

By the use of such a construction and arrangement, it is possible to achieve that the mud and dirt thrown by the wheels from the road surface against the vehicle body is caught by this mud guard. Simultaneously therewith, the deflecting ledge portion thereof prevents soiling of the lowermost section of the vehicle body.

Notwithstanding these advantages obtainable in accordance with the present invention, no additional structural parts are required.

In a vehicle body provided with an external decorative strip located within the region of the sill or threshold of the vehicle, which is secured, for example, at the longitudinal bearer member of the vehicle body, the decorative strip continues within the upper region thereof disposed closest to the door aperture, the outer contour of the vehicle body sidewall parts whereas in the lower part thereof, it is extended outwardly beyond this contour. In addition to protecting the door gap, the decorative strip is also protected thereby against soiling so that the clothes of the passenger cannot be soiled or dirtied while boarding or leaving the vehicle. The lower part of the decorative strip or ledge thereby extends beyond the contours of the outer body wall parts of the vehicle body in such a manner that at least the door gap, preferably also a part of the door adjacent the door gap is protected against the road surface. The decorative strip is a pressed or stamped part having a U-shaped cross section, the center web portion of which is stamped in a V-shaped manner and is supported by means of the free leg portions thereof at the longitudinal bearer member. The longitudinal bearer member, and preferably the outer pressed or stamped part thereof is provided with a U-shaped stamped or pressed-out portion of the longitudinal bearer member and may be connected thereto in any suitable manner, for example, by welding.

Additionally, within the region of the inlet or ingress aperture of the vehicle body, a shaped ledge member may be provided which is preferably made integral or unitary with the decorative strip and which forms the abutment surface for the sealing strip of the door and is constructed at the free end thereof extending into the passenger space as a retaining means for the floor covering of the vehicle passenger space.

Accordingly, it is an object of the present invention to provide a body construction, particularly for passenger motor vehicles, which effectively obviates the disadvantages of the prior art constructions, especially insofar as the door sill and threshold arrangements thereof and protections therefor are concerned.

Another object of the present invention is the provision of a simple, inexpensive and highly effective vehicle body construction which does not impair the streamlined contours of the vehicle body, which is simple in requiring no additional parts and which effectively protects the door gap formed between the vehicle body parts and the door against soiling by mud or dirt thrown up from the road by the vehicle wheels.

A further object of the present invention resides in the provision of an effective simple and inexpensive mud and stone guard deflector disposed on the outer body walls of the vehicle within the region of the passenger door of the vehicle.

Still another object of the present invention is the provision of a decorative strip connected with a longitudinal bearer member within the region of the door sill of the vehicle in such a manner as to effectively protect the vehicle parts thereat while at the same time preventing the splashing of water against those parts which are normally exposed and which might come in contact with the passengers' clothing while boarding or leaving the vehicle.

A still further object of the present invention lies in the provision of simple means utilizing already existing parts to assure effective sealing of the door gap.

Another object of the present invention is the provision of a decorative strip which not only protects certain vehicle parts but which extends into the interior passenger space of the vehicle in such a manner as to constitute therein the retaining means for the floor covering.

Still another object of the present invention is the provision of a decorative strip which not only protects the vehicle parts against water and particles thrown up by the wheels, but which also permits compensation in the vehicle construction due to inaccuracies in the manufacture thereof.

Figure 2:
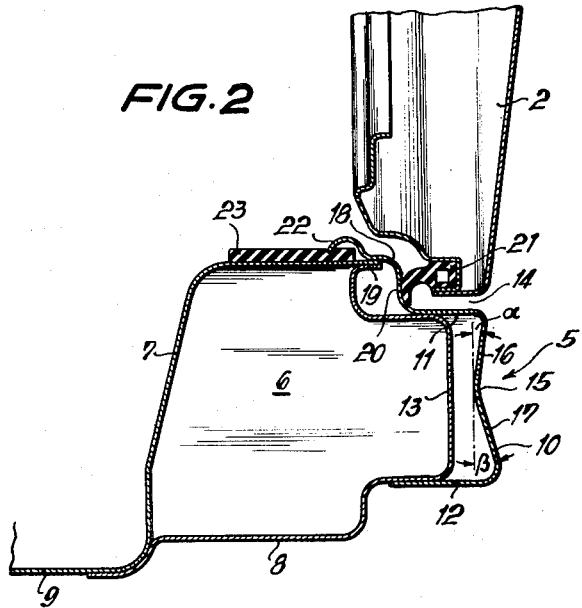

These and other objects, features and advantages of the present invention will become more obvious from the following description when taken in connection with the accompanying drawing, which shows, for purposes of illustration only, one embodiment in accordance with the present invention, and wherein:

FIGURE 1 is a side view of a passenger motor vehicle provided with a body construction intermediate the front and rear wheels thereof in accordance with the present invention, and FIGURE 2 is a partial cross-sectional view taken along line II—II of FIGURE 1.

Referring now to the drawing, wherein like reference numerals are used throughout the two views to designate like parts, and more particularly to FIGURE 1, the assembly and construction of the vehicle body thereof comprises a front fender 1, a door 2 as well as a rear fender 3 for each vehicle side which is completed by the roof portion 4 covering the passenger space of the vehicle. The door or the corresponding aperture in the vehicle body is bridged by a threshold or sill member generally designated by reference numeral 5 (FIGURES 1 and 2) which forms outside the region of the door 2 a part of the side wall of the vehicle body and preferably extends over the entire length of the vehicle body between the front and rear wheels of the vehicle.

The threshold or sill 5 is formed by a longitudinal bearer member 6 (FIGURE 2) which is composed of two pressed or stamped parts 7 and 8, whereby the part 7 is preferably made in one piece with the sheet metal floor part 9 of the vehicle. The pressed or stamped part 8 is provided on the outside thereof with a decorative strip or ledge member 10 which has an essentially U-shaped profile in cross section thereof. The leg portions 11 and 12 of the U-shaped decorative strip 10 are placed over a corresponding U-shaped stamped-out portion 13 in the pressed or stamped part 8 of the longitudinal bearer member 6 and are connected therewith in any suitable manner, for example, by welding. The leg portion 11 of the decorative strip 10 defines together with the door 2 the lower door gap 14 disposed therebetween.

The web portion 15 of the decorative strip 10 connecting the leg portions 11 and 12 thereof is shaped, for example, by being stamped or pressed inwardly in a V-shaped manner, whereby one, namely the upper part 16 of the web portion 15 continues the contour determined by the outline of the door 2 and forms, for example, an angle α of seven to eight degrees with respect to the vertical. The lower part 17 of the web portion 15 of the decorative strip 10 is drawn outwardly over the outer wall parts and subtends with the vertical an angle β, for example, of fifteen degrees. By reason of the more strongly angularly bent contour of the lower part 17 of the web portion 15, not only the door gap 14 is thereby effectively protected against the road surface, but also the part of the door adjacent the door gap 14 is screened against the road surface.

A further suitably shaped ledge member 18 is accommodated in accordance with the present invention, within the door gap 14, which ledge member 18 serves as a cover for the connecting flange 19 of the pressed or stamped parts 7 and 8 forming the longitudinal bearer member 6 and also forms an abutment surface 20 for a sealing strip 21 suitably secured within the door 2. This ledge member 18 may be formed integrally with the decorative strip 10 or may also form a separate part thereof, whereby in the latter case there exists the possibility of adjustment of this ledge member 18 for purposes of compensation for inaccuracies in the manufacture of the vehicle body. By the use of such an arrangement, it is possible to assure that the sealing strip 21 abuts at all times against the shaped ledge member or strip 18 in a manner producing an unobjectionable sealing of the door gap.

The free end 22 of the ledge member 18 which extends into the passenger space is also used for purposes of securing or retaining the floor covering 23 by bending the free end 22 in a hook-like manner and thereby pressing the floor covering 23 inserted therebetween in a spring-like manner against the pressed or stamped part 7 of the longitudinal bearer member 6.

While we have shown and described one embodiment in accordance with the present invention, it is understood that the same is not limited thereto but is susceptible of many changes and modifications within the spirit and scope of the present invention, and we, therefore, do not wish to be limited to the details illustrated herein but intend to cover all such changes and modifications as are encompassed by the scope of the appended claims.

We claim:

1. A vehicle body construction for motor vehicles having a plurality of front and rear wheels, comprising a plurality of shaped outer body wall parts having outer surfaces and including at least one door arranged between said front and rear wheels, said outer body wall parts defining the outer surface of the vehicle, floor means extending substantially the entire vehicle width and having a substantially vertically extending rim portion, a frame for supporting said body wall parts including a longitudinal bearer member extending between said front and rear wheels adjacent said outer body wall parts, said longitudinal bearer member essentially conforming to the contour of the adjoining outer body wall parts of the vehicle body and forming a threshold for the vehicle and being formed by said vertically extending rim portion of the floor means and a separate sheet metal part secured thereto, and a decorative strip secured directly to said longitudinal bearer member adjacent said threshold and extending outwardly beyond the contour of the adjoining outer body wall parts on the side of the vehicle body facing the road thereby forming a mud guard for the vehicle body and said threshold, the portion of said decorative strip means adjacent said door representing an extension in the outer contour of said door.

2. A vehicle body construction for motor vehicles having a plurality of front and rear wheels, comprising a plurality of shaped body wall parts having outer surfaces and including at least one door panel arranged between said front and rear wheels, said outer surfaces defining the outer contour of the vehicle, a floor having an essentially vertically extending rim portion, a frame for supporting said body wall parts including a longitudinal bearer member extending between said front and rear wheels, said longitudinal bearer member being formed by said rim portion of the floor and a separate sheet metal member secured thereto, said sheet metal member including a U-shaped portion extending outwardly with respect to the vehicle longitudinal center plane, said longitudinal bearer member essentially conforming to the contour of the adjoining outer body wall parts of the vehicle and forming a threshold for the vehicle, and a decorative strip secured directly to said U-shaped portion of said longitudinal bearer means adjacent said threshold and forming a part of the outer body contour of the vehicle thereby forming a mud guard for the vehicle body, the portion of said decorative strip means adjacent said door panel representing an extension of the contour of said door panel.

3. A vehicle body construction for motor vehicles according to claim 2, wherein said decorative strip is constituted by a stamped member of essentially U-shaped cross section, the free leg portions of said U-shaped member being secured directly to the U-shaped portion of said longitudinal bearer member.

4. A vehicle body construction for motor vehicles according to claim 2, including a sealing strip for said door, a covering for the floor of said body, and wherein said decorative strip includes a ledge means forming the abutment surface for said sealing strip for said door and extending inwardly into the passenger space with the free end thereof to constitute thereat a retaining means for said vehicle floor covering.

5. A vehicle body construction for motor vehicles having a plurality of front and rear wheels, comprising a plurality of shaped outer body wall parts having outer surfaces and including at least one door, floor means extending substantially the entire vehicle width and having a substantially vertically extending rim portion, a longitudinal bearer member extending between said front and rear wheels adjacent said outer body wall parts and conforming to the contour of the adjoining outer body wall parts of the vehicle body, said longitudinal bearer member being formed by said rim portion of the floor means and a sheet metal part secured thereto and forming a threshold for the vehicle, and means rigidly connected with said threshold and extending outwardly beyond the contour of the adjoining outer body wall parts on the side of the vehicle body facing the road to thereby form a mud guard for the vehicle body including a decorative strip means secured to said longitudinal bearer member on the outside thereof, said decorative strip means having an upper portion extending inwardly and downwardly of the body in continuation of the outer wall surface of said door to form an angle $\alpha$ with the vertical and a lower portion projecting outwardly beyond the outer surface of the lower edge of said door and downwardly of said vehicle body to form an angle $\beta$ with the vertical, said angle $\alpha$ being greater than the said angle $\beta$.

References Cited in the file of this patent

UNITED STATES PATENTS

| | | |
|---|---|---|
| 2,054,951 | Saives | Sept. 22, 1936 |
| 2,216,120 | Ledwinka | Oct. 1, 1940 |
| 2,240,022 | Saives | Apr. 29, 1941 |
| 2,361,610 | Doty et al. | Oct. 31, 1944 |
| 2,431,524 | Ulrich et al. | Nov. 25, 1947 |
| 2,841,439 | Schwenk | July 1, 1958 |

FOREIGN PATENTS

| | | |
|---|---|---|
| 138,885 | Australia | Oct. 3, 1950 |

(Corresponding U.S. 2,482,906, Sept. 27, 1949)

| | | |
|---|---|---|
| 758,017 | France | Oct. 23, 1933 |